United States Patent [19]

Ishida et al.

[11] Patent Number: 5,375,111
[45] Date of Patent: Dec. 20, 1994

[54] OPTICAL INFORMATION RECORDING MEDIUM, AND AUDIO AND VIDEO INFORMATION RECORDING METHOD

[75] Inventors: Takashi Ishida; Shunji Ohara; Tadashige Furutani, all of Osaka, Japan

[73] Assignee: Matsushita Electric Industrial Co., Ltd., Osaka, Japan

[21] Appl. No.: 984,526

[22] Filed: Dec. 2, 1992

[51] Int. Cl.⁵ .................................................. G11B 7/26
[52] U.S. Cl. .................... 369/121; 369/275.3; 358/342
[58] Field of Search ............... 369/275.3, 121, 32; 360/19.1, 32; 358/341, 342, 343

[56] References Cited

U.S. PATENT DOCUMENTS

| | | | |
|---|---|---|---|
| 5,166,804 | 11/1992 | Takahashi | 358/342 |
| 5,218,450 | 6/1993 | Nagai et al. | 358/342 |
| 5,233,478 | 8/1993 | Kanota | 360/19.1 |
| 5,262,877 | 11/1993 | Otsuka | 360/19.1 |

*Primary Examiner*—Paul M. Dzierzynski
*Assistant Examiner*—Kim-Kwok Chu
*Attorney, Agent, or Firm*—Willian Brinks Hofer Gilson & Lione

[57] ABSTRACT

An optical disk for recording audio and video information in unit of field or sector has a recording format that provides an area for recording all audio information to be recorded in each unit immediately after an area used to set the power of the optical beam to a desired level. Also, an audio and video information recording method using the optical disk having the recording format mentioned above is disclosed. According to this method, after-recording of audio information is made at a desired level of the power of the optical beam.

7 Claims, 12 Drawing Sheets

OPTICAL INFORMATION RECORDING MEDIUM, AND AUDIO AND VIDEO INFORMATION RECORDING METHOD

BACKGROUND OF THE INVENTION

1. Field of the Invention

The present invention relates to a recording method for recording audio and video information to an optical disk or similar optical information recording medium using a semiconductor laser (laser diode), and to the optical information recording medium itself.

2. Description of the Prior Art

The technologies needed to record and playback high density data to an optical disk or similar optical information recording medium using optical beam energy are well known, and a variety of devices that can be used to record audio and video information, also known as multimedia information, to optical disks are commercially available. An example of a conventional recording method for capturing multimedia information to an optical disk is described below with reference to FIGS. 11 and 12.

FIG. 11 shows a typical optical disk used in the conventional multimedia information recording method. Disk address information is recorded using lands and pits imprinted to the address areas 114, 115 of the disk, and the data is recorded to and read from the spiral data track 116 by means of scanning the track with an optical spot.

By driving the optical disk in FIG. 11 at 1800 rpm, a single NTSC-format image frame can be recorded in one revolution of the disk. More specifically, the first field is recorded to the first half revolution of the track 116 (A), and the second field is recorded to the other half revolution of the track 116 (B).

The upper part (a) of FIG. 12 shows a recording format used in this conventional multimedia information recording method.

An LPC (laser power control) area 117 is provided after the address 101 to set the laser power to a desired level in the first field, and is followed by area A1 118 for recording the first audio channel, a gap 119, area A2 120 for recording the second audio channel, a gap 121, video area 122 for recording the video information, a gap 123, area A3 124 for recording the third audio channel, a gap 125, and area A4 126 for recording the fourth audio channel.

The second field is recorded with a similar sequence: LPC field 129 following the address 128 to set the laser power to a desired level, area A1 130 for recording the first audio channel, a gap 131, area A2 132 for recording the second audio channel, a gap 133, video area 134 for recording the video information, a gap 135, area A3 136 for recording the third audio channel, a gap 137, and area A4 138 for recording the fourth audio channel.

The two LPC areas 117 and 129 are needed because the optical power must be set to an optimum power level for recording to an optical disk. A semiconductor laser is a current-driven device, and the optical output is controlled by adjusting the driving current. The driving current required to obtain a given optical output level, however, has a high temperature dependency. As a result, maintaining a constant driving current will not necessarily assure a constant optical output power. To obtain the optimum recording power, it is therefore necessary to monitor the optical output, regulate the driving current to control the optical output as required to obtain the required recording power, and thus adaptively set the driving current according to the optimum recording power. A predetermined time period is required to complete this operation, and the LPC areas 117 and 129 provide this period.

While the above description relates specifically to a semiconductor laser, the optical output of other light sources is also affected to varying degrees by the ambient temperature, and need for the LPC areas 117 and 129 thus remains.

The middle part (b) of FIG. 12 shows the laser waveform when the above data format is recorded to a phase-change erasable recording medium. With a phase-change erasable recording medium, the optical output is modulated between the playback power level and two higher power levels, specifically, bias and peak power levels; the bias power is used for data erasing, and the peak power level for recording.

During the LPC area 117, the optical output is set from the playback power $P_R$ to the bias power $P_B$ and the peak power $P_P$. The laser power is thereafter modulated between these levels according to the type of information (audio or video) being recorded.

Audio and video information recorded in this format can be used in various ways, one being to record only the audio portion to a previously recorded video segment. Sometimes referred to as "after-recording," this presents several problems in the conventional recording method as described above.

Consider the use of after-recording with the conventional recording format illustrated in FIG. 12 (a). The laser power waveform used at this time is shown in the lower part (c) of FIG. 12.

During the LPC area 117 the laser output is increased from the playback power $P_R$ to the bias power $P_B$ and then the peak power $P_P$ (period C). The laser is then modulated to record the first and second audio channels (period D), but must be dropped to the playback power $P_R$ level (period E) during the video field 122 because the video data is not to be changed.

The third and fourth audio channels 124, 126 should then be recorded, but cannot because the laser power has already been dropped to the playback power $P_R$ level, and there is no LPC area in which the optical output can be set. As a result, the third and fourth audio channels 124, 126 are not recorded (period F).

As is obvious, the problem with the conventional recording method using this recording format is that satisfactory audio after-recording is not possible.

SUMMARY OF THE INVENTION

Therefore, an object of the present invention is to provide a recording method for recording audio and video information to an optical information recording medium that can also be used for satisfactory audio after-recording. A further object is to provide an optical information recording medium for this purpose.

To achieve this object, the audio and video information recording method of the invention is characterized by recording the audio and video information using a recording format in which an audio information recording area is provided immediately after an LPC area used to set the power of the optical beam to a desired power level.

BRIEF DESCRIPTION OF THE DRAWINGS

The present invention will become more fully understood from the detailed description given below and the accompanying drawings wherein.

DESCRIPTION OF PREFERRED EMBODIMENTS

Figure 1:
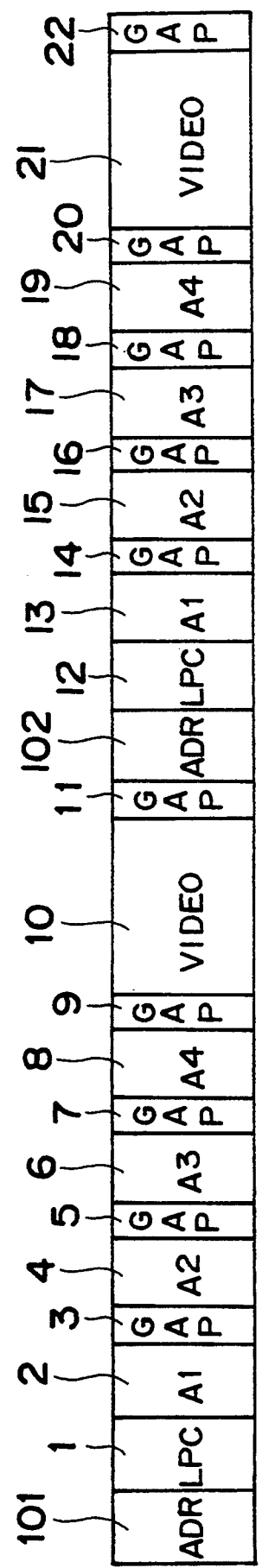
FIG. 1 is an illustration of the recording format used in the audio and video information recording method of the first embodiment of the invention.
Figure 11:
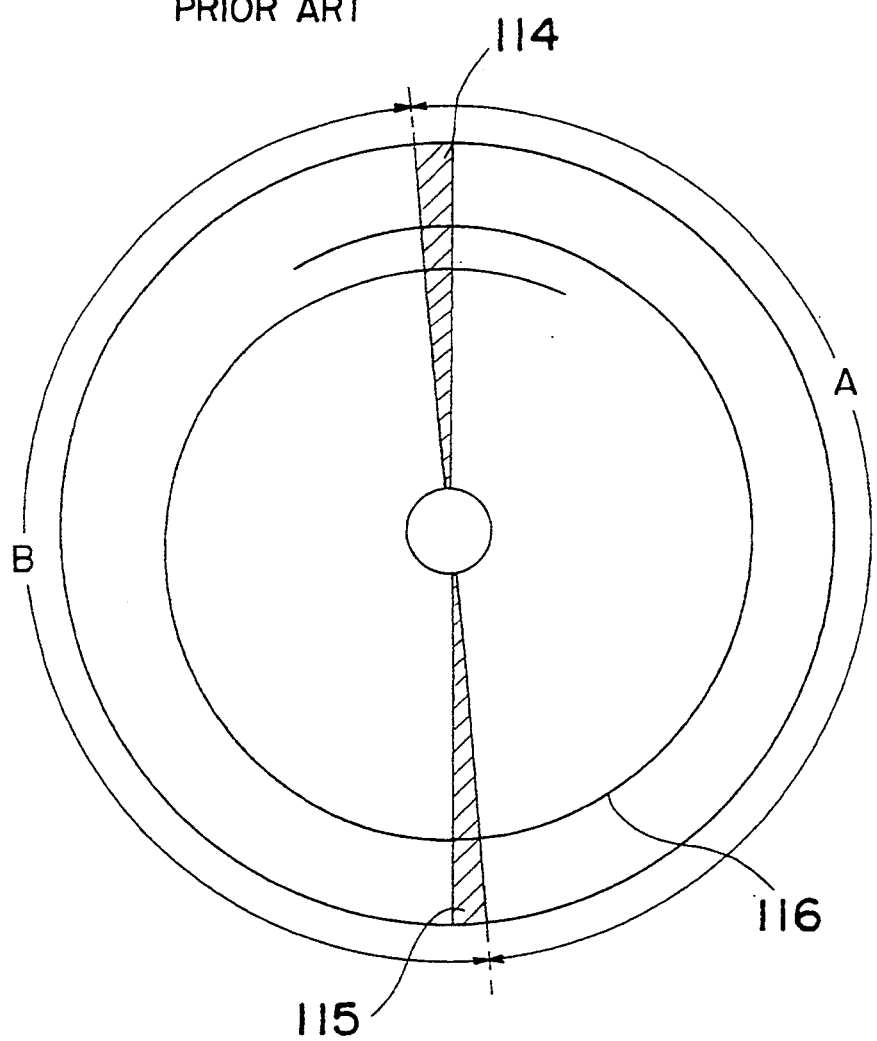
FIG. 11 is an illustration of the optical disk used in the conventional audio and video information recording method, and FIG. 12(a-c) is an illustration of the recording format and waveform used in the conventional audio and video information recording method.
Figure 12:
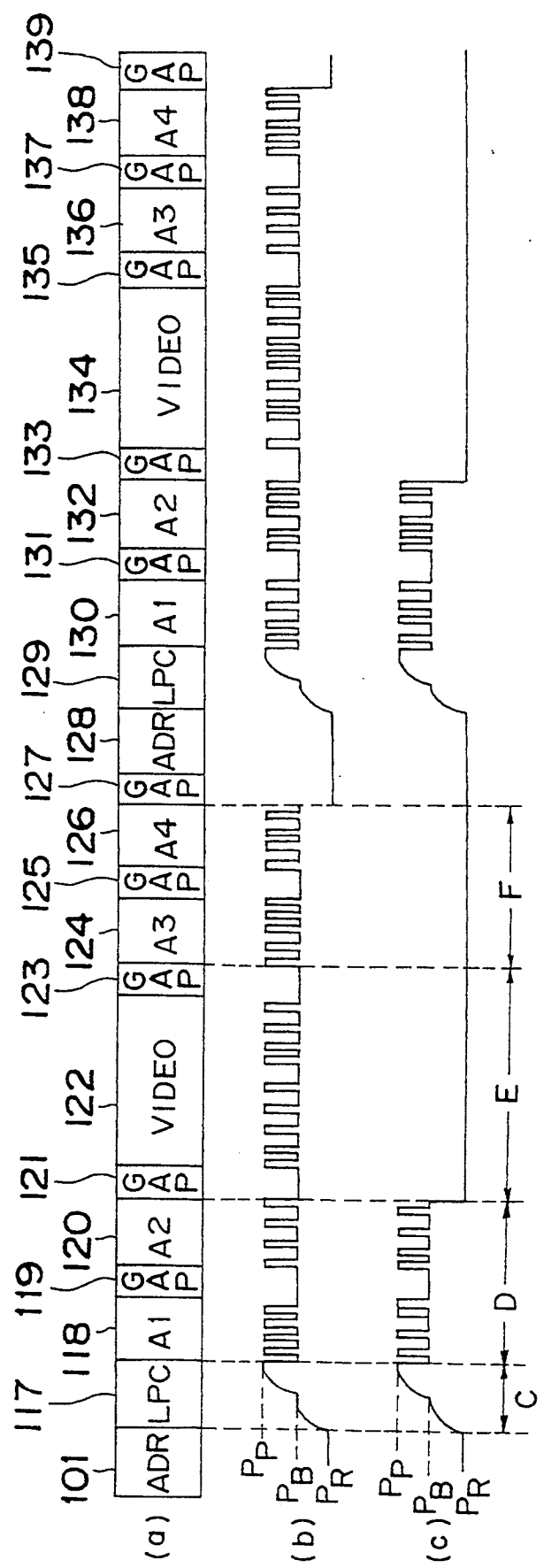

The preferred embodiments of the present invention are described hereinbelow with reference to the accompanying figures, of which FIG. 1 is an illustration of the recording format used in the audio and video information recording method of the first embodiment of the invention. The audio and video information recording method of the first embodiment of the invention uses a conventional optical disk as illustrated in FIG. 11.

This recording format comprises two field segments for a single image. The first field location is identified by the first address 101, which is followed in this format by an LPC area 1 used to set the laser power to a desired level, area A12 for recording the first audio channel, a gap 3, area A2 4 for recording the second audio channel, a gap 5, area A3 6 for recording the third audio channel, a gap 7, area A4 8 for recording the fourth audio channel, a gap 9, and then a video area 10 for recording the video information followed by another gap 11 before the second address 102 for the second field.

The second field is recorded with a similar sequence: an LPC field 12 used to set the laser power to the desired level following the address 102, area A1 13 for recording the first audio channel, a gap 14, area A2 15 for recording the second audio channel, a gap 16, area A3 17 for recording the third audio channel, a gap 18, area A4 19 for recording the fourth audio channel, a gap 20, and then a video area 21 for recording the video information.

Figure 2:
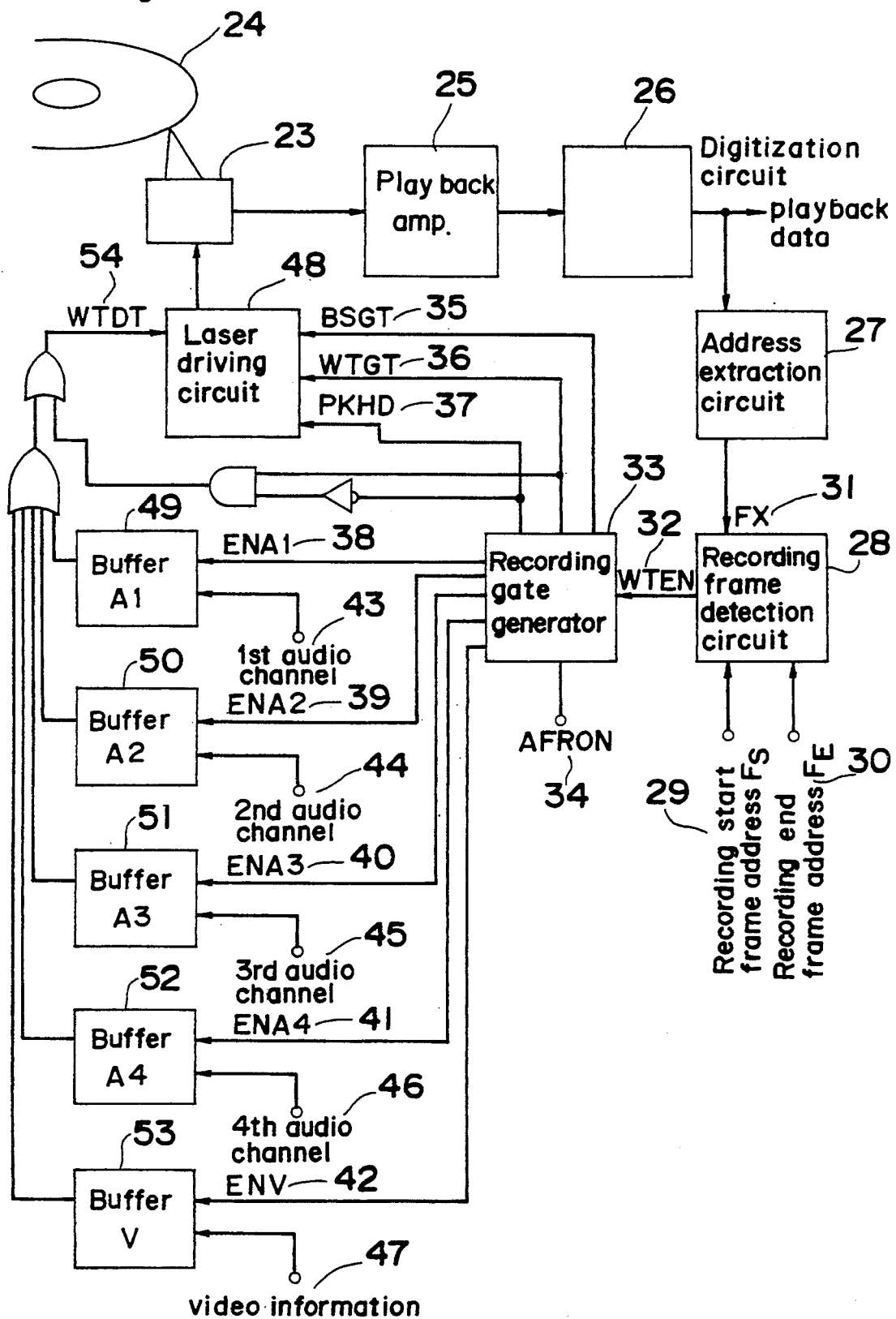
FIG. 2 is a block diagram of the read/write device in which the recording method of the first embodiment of the invention is achieved.

FIG. 2 is a block diagram of the read/write device used to record the recording format shown in FIG. 1. Referring to FIG. 2, an optical head 23 reads from and writes to an optical disk 24 by focusing an optical spot on the optical disk 24 at a required power level.

The playback signal is amplified by a playback amplifier 25. A digitization circuit 26 then digitizes the playback signal and outputs the playback data. This data is also input to an address extraction circuit 27, which extracts the frame number and other address data from the address area in the playback data, and outputs to a recording frame detection circuit 28.

The recording frame detection circuit 28 compares the previously input recording start frame address FS 29 and the recording end frame address FS 30 with the current frame address FX 31 input from the address extraction circuit 27, and outputs a WTEN signal 32 when the test (FS$\leq$FX$\leq$FE) returns true.

A recording gate generator 33 outputs gate signals required for recording when the WTEN signal 32 is output from the recording frame detection circuit 28. Specifically, it outputs BSGT signal 35, WTGT signal 36, and PKHD signal 37 to a semiconductor laser drive circuit 48, and outputs ENA1 signal 38, ENA2 signal 39, ENA3 signal 40, ENA4 signal 41, and ENV signal 42 to buffers A1 49, A2 50, A3 51, A4 52, and V 53, respectively. In addition, the recording gate generator 33 modulates each of the gate signals according to an after-recording ON/OFF signal 34.

The semiconductor laser drive circuit 48 drives the semiconductor laser for data reading and writing.

The buffers A1 49, A2 50, A3 51, A4 52 are first, second, third, and fourth audio channel data buffers, respectively. Each buffer outputs when the respective input signal (ENA1 signal 38, ENA2 signal 39, ENA3 signal 40, and ENA4 signal 41) is HIGH. The video information buffer V 53 similarly outputs when the input signal thereto (ENV signal 42) is HIGH.

Figure 3:
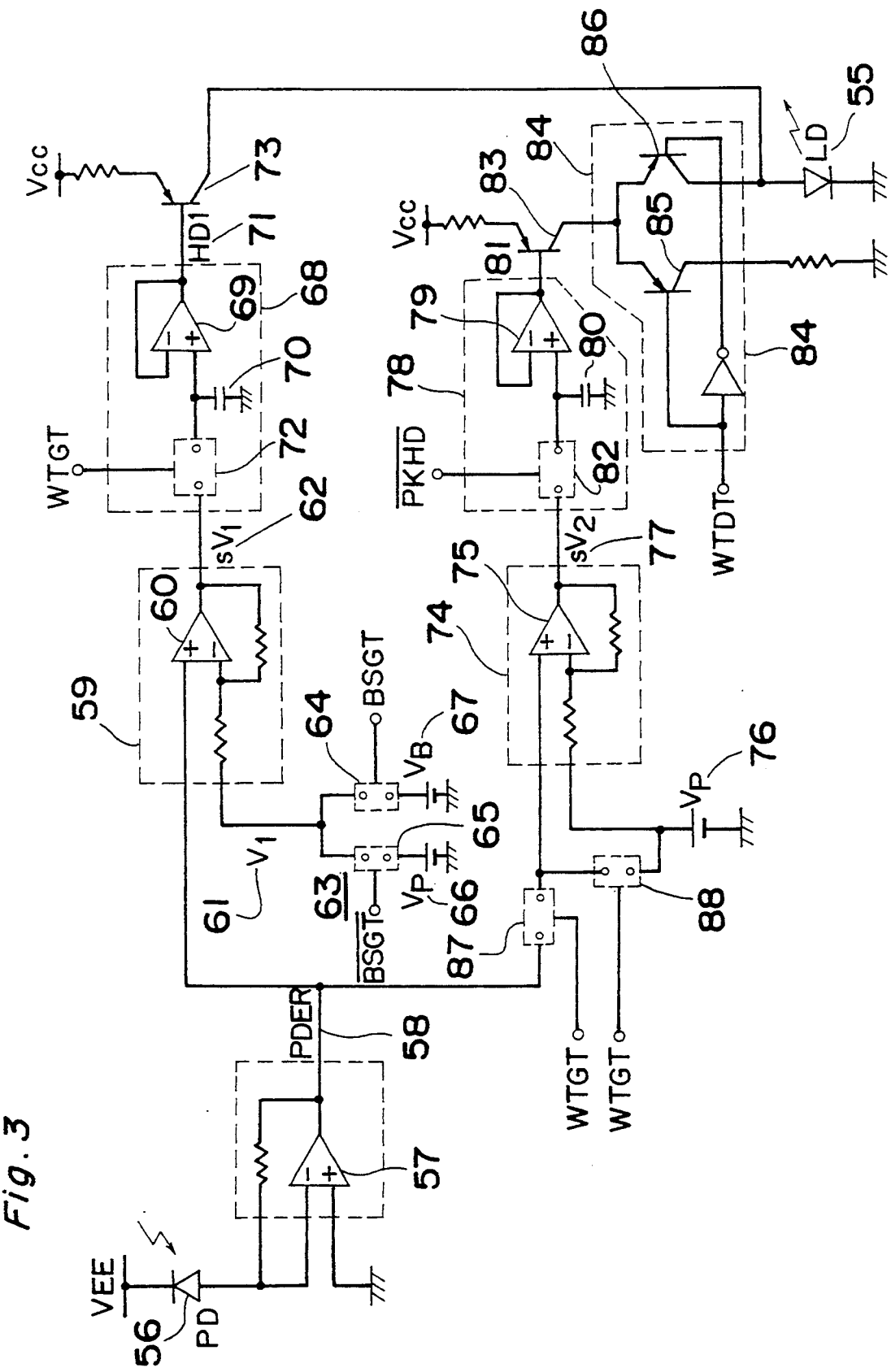
FIG. 3 is a block diagram of the semiconductor laser drive circuit used in the read/write device in which the recording method of the first embodiment of the invention is achieved, FIG. 4(a-l) is a waveform diagram used to describe the audio after-recording operation of the recording method of the first embodiment of the invention, FIG. 5(a-l) is a waveform diagram used to describe the normal recording operation of the recording method of the first embodiment of the invention.

FIG. 3 is a block diagram of the semiconductor laser drive circuit 48 shown in FIG. 3. Referring to FIG. 3, a photodetector 56 detects an optical output of a semiconductor laser 55 to generate a current output.

An operational amplifier 57 converts the current output from the photodetector 56 to a voltage to generate an optical power control error voltage PDER 58. The PDER 58 is input to a first closed loop control means 59 and switch 87.

A first closed loop control means 59 is an operational amplifier 60 that compares the optical power control error voltage PDER 58 with a first reference voltage V1 61 to output a first control voltage SV1 62 to a first sample hold means 68.

The first reference voltage V1 61 is generated by a first reference voltage generator 63. When the BSGT signal 35 is LOW, switch 64 turns OFF, switch 65 turns ON, and a reference voltage VP 66, which is used to output the playback power $P_R$, is output as the first reference voltage V1 61. When the BSGT signal 35 is HIGH, switch 64 turns ON, switch 65 turns OFF, and a reference voltage VB 67, which is used to output a bias power $P_B$, is output as the first reference voltage V1 61.

The first sample hold means 68 holds the first control voltage SV1 62 by means of an operational amplifier 69 and capacitor 70, and outputs a first hold voltage HD1 71. A switch 72 in the first sample hold means 68 is ON when the WTGT signal 36 is LOW, and turns OFF when the WTGT signal 36 is HIGH.

The first hold voltage HD1 71 is input to the base of a transistor 73, which current drives the semiconductor laser 55.

A second closed loop control means 74 is an operational amplifier 75 that compares the optical power control error voltage PDER 58 with a reference voltage VP 76 used for a peak power $P_P$ output to output a second control voltage SV2 77 when the WTGT signal 36 is HIGH.

The second control voltage SV2 77 is input to a second sample hold means 78, which holds the input voltage by means of an operational amplifier 79 and capacitor 80, and outputs a second hold voltage HD2 81. A switch 82 in the second sample hold means 78 turns ON when the PKHD signal 37 is LOW, and turns OFF when it is HIGH.

The second hold voltage HD2 81 is input to the base of a transistor 83, which current drives the semiconductor laser 55.

The output from the transistor 83 is input to a light pulse modulation means 84, which switches the flow of the current from the transistor 83 to the semiconductor laser 55 ON and OFF by differential switching of transistors 85 and 86 according to the WTDT signal 54.

Figure 4:
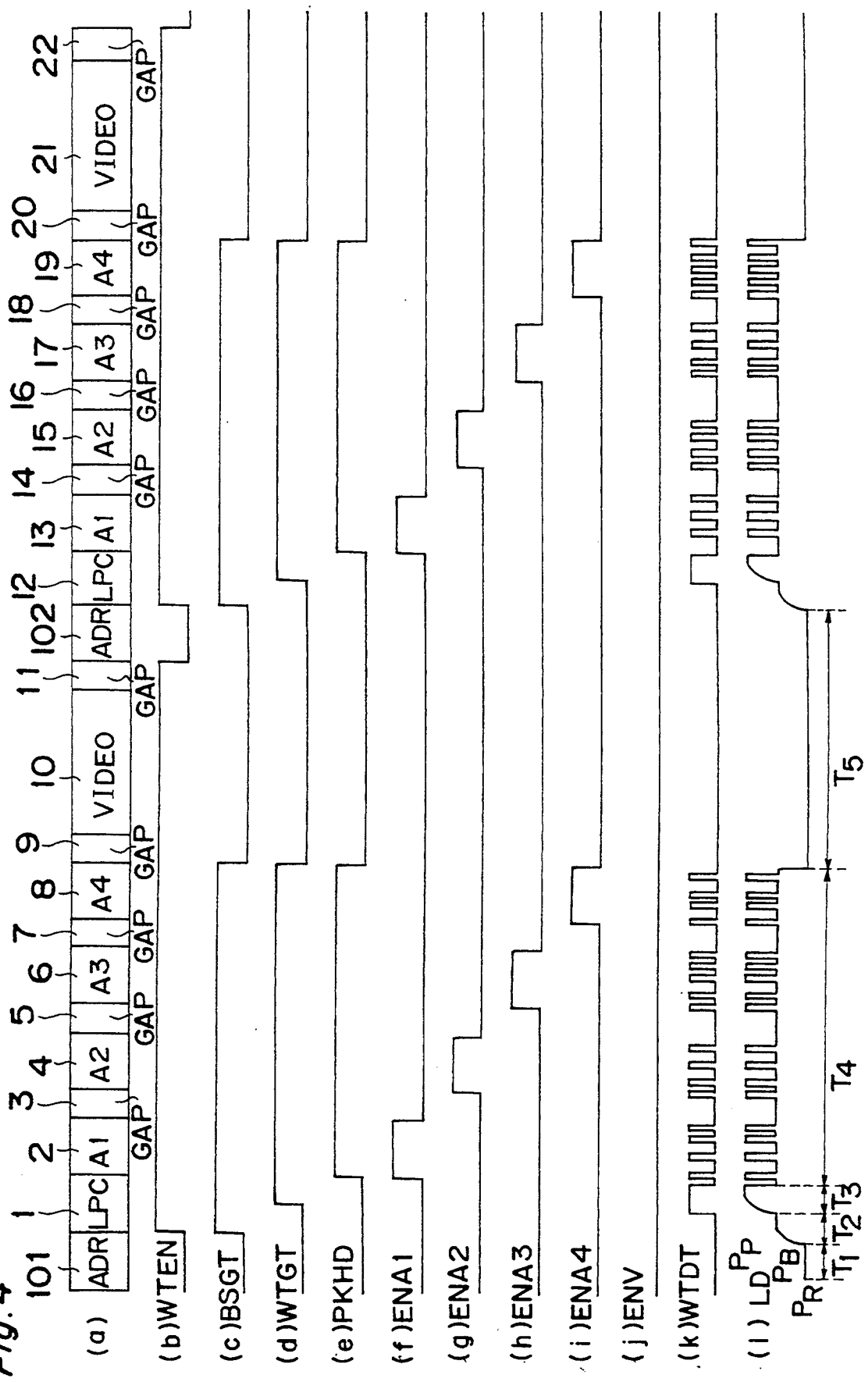

FIGS. 4(a–l) are operating waveform diagrams by the recording method according to the first embodiment of the invention during audio after-recording operation. Operation of this function is described next.

For easy reference, the recording format shown in FIG. 1 is shown in (a) of FIG. 4.

The recording frame detection circuit 28 determines the frame to be recorded from the frame address in the address blocks 101 and 102, and outputs the WTEN signal shown in (b) of FIG. 4.

The recording gate generator 33 detects WTEN signal output and the ON state of the after-recording ON/OFF signal, and outputs gate signals. The gate signal states output for the first field may be as follows.

The BSGT signal is HIGH from the beginning of the LPC area 1 to the end of the fourth audio channel recording area A4 8 ((c) of FIG. 4).

The WTGT signal is HIGH from midway through the LPC area 1 to the end of the fourth audio channel recording area A4 8 ((d) of FIG. 4).

The PKHD signal is HIGH from the end of the LPC area 1 to the end of the fourth audio channel recording area A4 8 ((e) of FIG. 4).

The ENA1 signal is HIGH only during the first audio channel recording area A1 2 ((f) of FIG. 4).

The ENA2 signal is HIGH only during the second audio channel recording area A2 4 ((g) of FIG. 4).

The ENA3 signal is HIGH only during the third audio channel recording area A3 6 ((h) of FIG. 4).

The ENA4 signal is HIGH only during the fourth audio channel recording area A4 8 ((i) of FIG. 4).

The ENV signal remains LOW ((j) of FIG. 4).

The resulting WTDT signal is therefore as shown in (k) of FIG. 4.

The semiconductor laser emission wave ((l) of FIG. 4) resulting from this signal sequence is described below.

Period T1

The first closed loop control means 59 is operating because the WTGT signal is LOW. Because the BSGT signal is LOW, the switch 65 is ON, the first reference voltage V1 61 is the reference voltage VP 66 used for playback power $P_R$ output, and a current resulting in playback power $P_R$ level emission is input to the semiconductor laser 55 from the transistor 73. In addition, the transistor 85 is ON, the transistor 86 is OFF, and the current output from the transistor 83 does not flow to the semiconductor laser 55 because the WTDT signal is LOW. The semiconductor laser 55 therefore emits at the playback power $P_R$ level.

Period T2

The first closed loop control means 59 is operating because the WTGT signal is LOW. Because the BSGT signal is HIGH, the switch 64 is ON, the first reference voltage V1 61 is switched to the reference voltage VB 67 used for bias power $P_B$ output, and the current flowing to the semiconductor laser 55 is increased to the current required for bias power emission by the transistor 73. In addition, the current output from the transistor 83 does not flow to the semiconductor laser 55 because the WTDT signal is LOW. The semiconductor laser 55 power is therefore increased to the bias power $P_B$ level.

Period T3

The WTGT signal becomes HIGH in this period, causing the switch 72 to turn OFF, interrupting closed-loop control by the first closed loop control means 59 and enabling open-loop control regulated by the first sample hold means 68 output. Essentially this assures that the bias power emission current continues to flow to the transistor 73.

However, because the WTGT signal is now HIGH, the switch 87 turns ON, the switch 88 turns OFF, and the second closed loop control means 74 operates. The reference voltage of the second closed loop control means 74 is the reference voltage VP 76 required to output at peak power $P_P$. In addition, the transistor 86 turns ON and the transistor 85 turns OFF because the WTDT signal is HIGH, causing the sum of the currents flowing to the two transistors 73 and 83 to be input to the semiconductor laser 55. The semiconductor laser 55 power level is therefore increased to peak power.

Period T4

The PKHD signal becomes HIGH, causing switch 82 to turn OFF, interrupting closed-loop control by the second closed loop control means 74 and enabling open-loop control regulated by the second sample hold means 78 output. When the WTDT signal becomes HIGH hereafter, the sum of the currents flowing to the two transistors 73 and 83 is input to the semiconductor laser 55; when WTDT is LOW, only the current flowing to the transistor 73 is supplied to the semiconductor laser 55. As a result, the semiconductor laser 55 power level is modulated between the peak and bias power levels according to the WTDT signal state and the audio information is recorded.

Period T5

The first closed loop control means 59 is operating because the WTGT signal is LOW. Because the BSGT signal is LOW, the switch 65 is ON, the first reference voltage V1 61 switches to the reference voltage VP 66 used for playback power $P_R$ output, and the current supplied to the semiconductor laser 55 from the transistor 73 is reduced to the current level resulting in playback power $P_R$ level emission. In addition, the transistor 85 is ON, the transistor 86 is OFF, and the current output from the transistor 83 does not flow to the semiconductor laser 55 because the WTDT signal is LOW. The semiconductor laser 55 therefore emits at the playback power $P_R$ level and the video information is not changed.

It is to be noted that the above operation described with reference to the first field is the same for the second field following thereafter, thus making it possible to record only the audio information.

Operation during a normal recording of both audio and video information is described below with reference to the waveform diagram shown in FIGS. 5(a–l).

Figure 5:
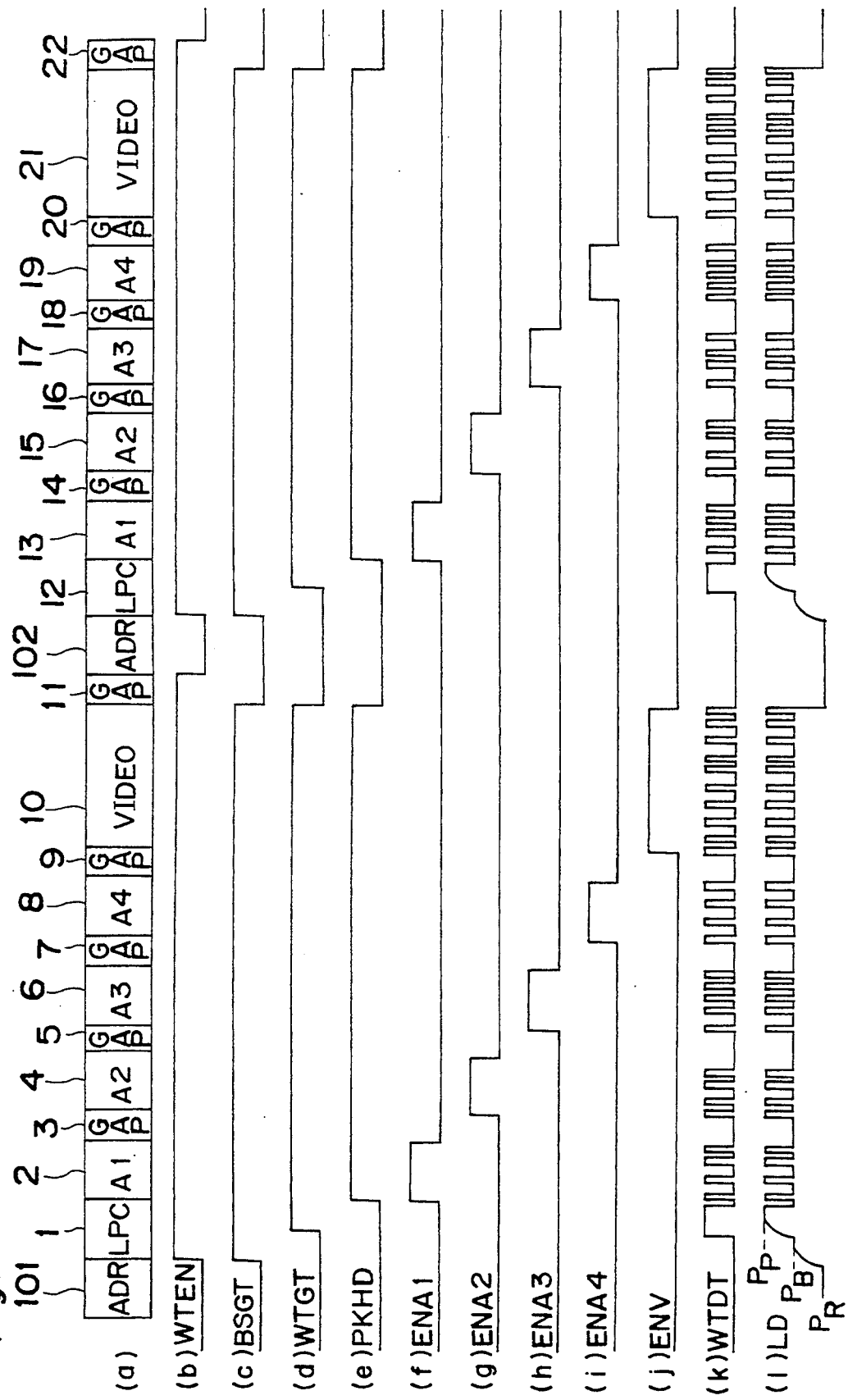

For easy reference, the recording format shown in FIG. 1 is shown again in (a) of FIG. 5.

The recording frame detection circuit 28 determines the frame to be recorded from the frame address in the address blocks 101 and 102, and outputs the WTEN signal shown in (b) of FIG. 5.

The recording gate generator 33 detects the WTEN signal output and the OFF state of the after-recording ON/OFF signal, and outputs the gate signals. The gate signal state output for the first field may be as follows.

The BSGT signal is HIGH from the beginning of the LPC area 1 to the end of the video area 10 ((c) of FIG. 5).

The WTGT signal is HIGH from midway through the LPC area 1 to the end of the video area 10 ((d) of FIG. 5).

The PKHD signal is HIGH from the end of the LPC area 1 to the end of the video area 10 ((e) of FIG. 5).

The ENA1 signal is HIGH only during the first audio channel recording area A12 ((f) of FIG. 5).

The ENA2 signal is HIGH only during the second audio channel recording area A2 4 ((g) of FIG. 5).

The ENA3 signal is HIGH only during the third audio channel recording area A3 6 ((h) of FIG. 5).

The ENA4 signal is HIGH only during the fourth audio channel recording area A4 8 ((i) of FIG. 5). The ENV signal is HIGH only during the video area 10 ((j) of FIG. 5).

The resulting WTDT signal is therefore as shown in (k) of FIG. 5.

As shown in (l) of FIG. 5, the semiconductor laser emission wave resulting from this signal sequence is also modulated between the peak and bias power levels during the video areas 10 and 21 so that both audio and video information is recorded.

By thus recording the audio information immediately after the area used to adjust the laser power as described above according to the first embodiment of the invention, the audio after-recording, in which only the audio track is recorded after recording the video or an existing audio track is overwritten, becomes possible.

Second embodiment

A second embodiment of the invention is described below with reference to FIG. 6 which is an illustration of the optical disk used in the recording method of the invention.

Figure 6:
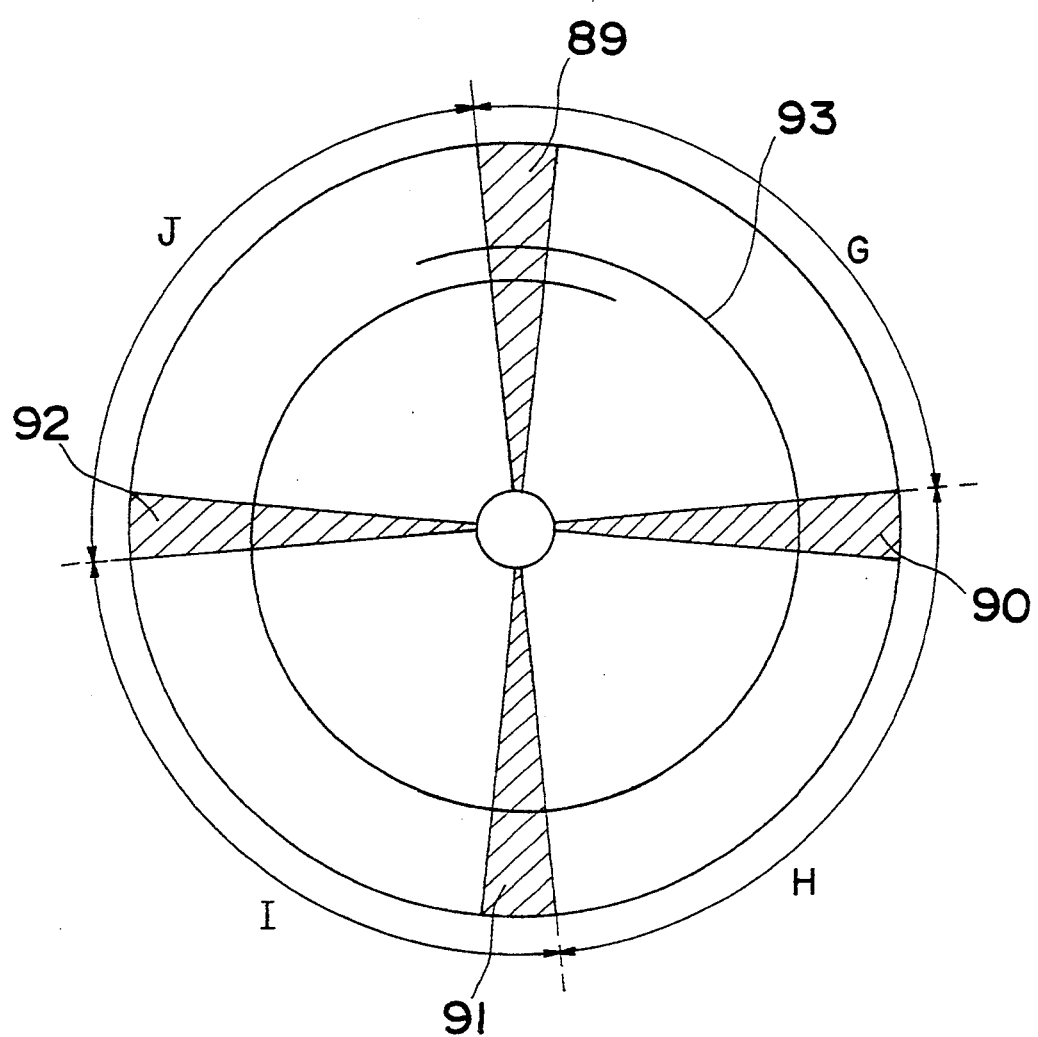
FIG. 6 is an illustration of the optical disk used in the audio and video information recording method according to a second embodiment of the invention.

As shown in FIG. 6, this optical disk comprises four address areas 89, 90, 91, 92, and a spiral data track. By driving this optical disk at 1800 rpm, a single frame of an NTSC-format image can be recorded in one-half revolution of the disk with each image frame recorded to two data sectors. Specifically, the first audio channel and one-half of the first field video information are recorded to a first sector (area G) of the first field, and the second audio channel and the other half of the first field video information are recorded to a second sector (area H) of the first field. The third audio channel and one-half of the second field video information are recorded to a first sector (area I) of the second field, and the fourth audio channel and the other half of the second field video information are recorded to a second sector (area J) of the second field.

The address block of the data signal therefore contains the frame number, the field number and the sector number. Using the track for frame number 100 as an example, data identifying frame number 100, field number 1 and sector 1 is written to the first address block 89; data identifying frame number 100, field number 1 and sector 2 is written to the second address block 90; frame number 100, field number 2 and sector 1 is written to the third address block 91; and frame number 100, field number 2 and sector 2 is written to the fourth address block 92.

Figure 7:
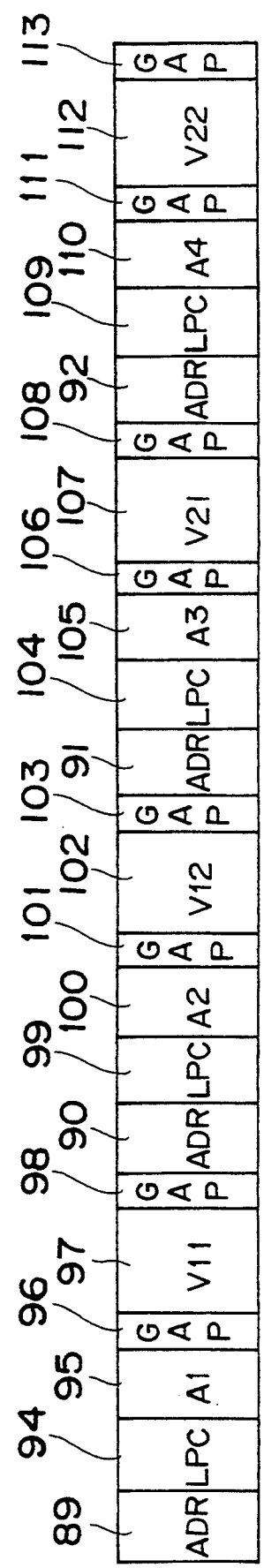
FIG. 7 is an illustration of the recording format used in the audio and video information recording method of the second embodiment of the invention.

The recording format used in the audio and video information recording method of the second embodiment of the invention is shown in FIG. 7.

Following the address block 89 for field 1 and sector 1 is the LPC area 94 used to set the laser power to the desired level, area A1 95 for recording the first audio channel, a gap 96, video area V11 97 for recording half of the first field video information, and a gap 98; next is address block 90 for field 1 and sector 2, LPC area 99 used to set the laser power to the desired level, area A2 100 for recording the second audio channel, a gap 101, video area V12 102 for recording the second half of the first field video information, and a gap 103; next is address block 91 for field 2 and sector 1, LPC area 104 to set the laser power to the desired level, area A3 105 for recording the third audio channel, a gap 106, video area V21 107 for recording the first half of the second field video information, and a gap 108; and next is address block 92 for field 2 and sector 2, LPC field 109 to set the laser power to the desired level, area A4 110 for recording the fourth audio channel, a gap 111, video area V21 112 for recording the second half of the second field video information, and a gap 113.

Figure 8:
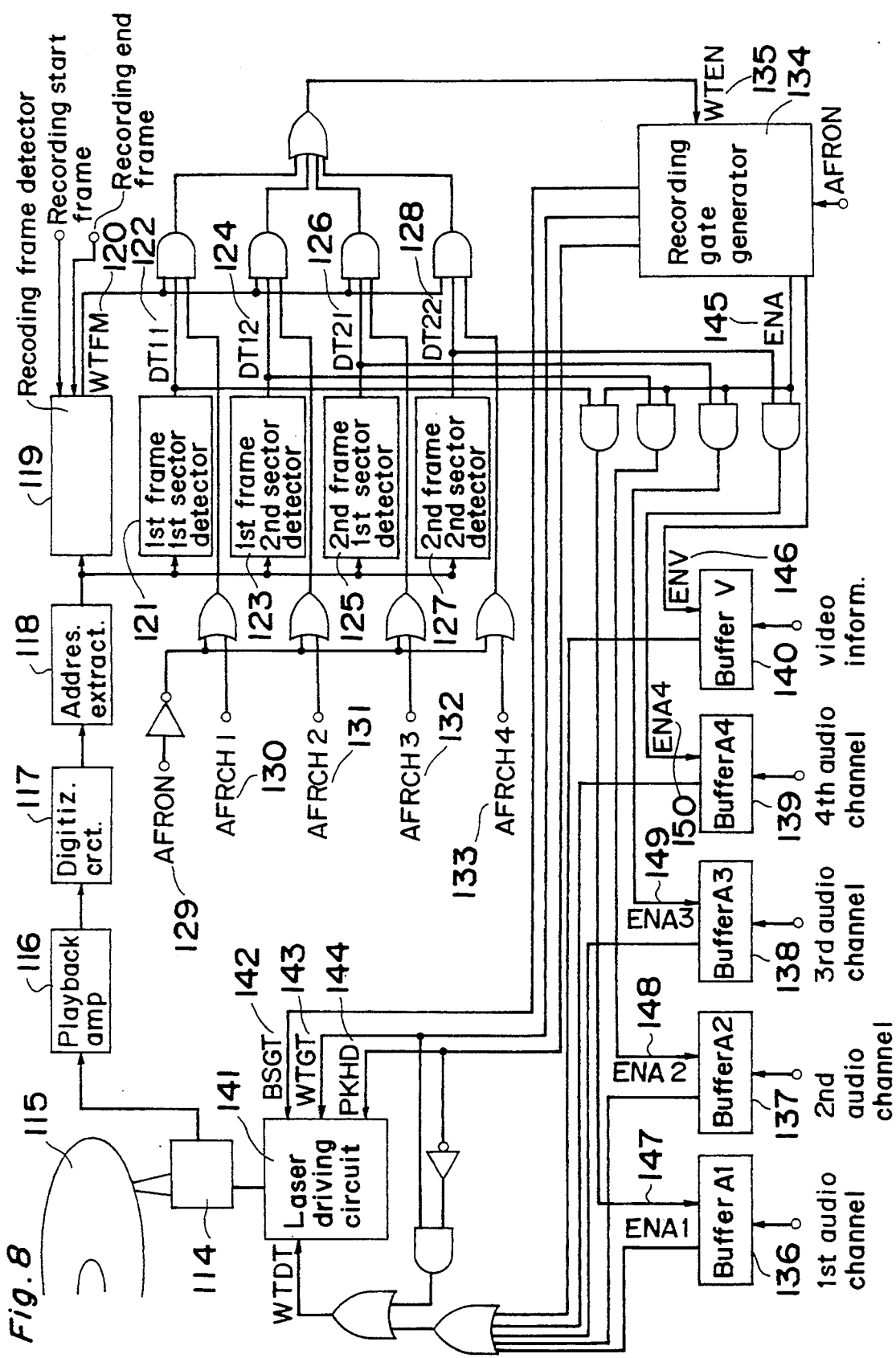
FIG. 8 is a block diagram of the read/write device in which the recording method of the second embodiment of the invention is achieved, FIG. 9(a-l) is a waveform diagram used to describe the audio after-recording operation of the recording method of the second embodiment of the invention, FIG. 10(a-l) is a waveform diagram used to describe the normal recording operation of the recording method of the second embodiment of the invention.

FIG. 8 is a block diagram of the read/write device used to record the recording format shown in FIG. 7. Referring to FIG. 7, an optical head 114 reads from and writes to an optical disk 115 by focusing an optical spot on the optical disk 115 at the required power level.

A playback signal is amplified by a playback amplifier 116. A digitization circuit 117 then digitizes the playback signal and outputs the playback data. This data is also input to an address extraction circuit 118, which extracts the frame number, field number, and sector number from the data read from the address block. This data is output to a recording frame detection circuit 119 and to field/sector number detection circuits 121, 123, 125 and 127.

The recording frame detection circuit 119 compares the previously input recording start frame number FS and the recording end frame number FS with the current frame number FX input from the address extraction circuit 118, and outputs a HIGH WTFN signal 120 during the addressed frame sectors when the test (FS≦FX≦FE) returns true.

The field 1, sector 1 detection circuit 121 checks the field and sector numbers output from the address extraction circuit 118, detects field 1, sector 1, and outputs a HIGH DT11 signal 122 in field 1, sector 1.

Similarly, the field 1, sector 2 detection circuit 123 detects field 1, sector 2, and outputs a HIGH DT12 signal 124 in field 1, sector 2.

Similarly, the field 2, sector 1 detection circuit 125 detects field 2, sector 1, and outputs a HIGH DT21 signal 126 in field 2, sector 1.

Similarly, the field 2, sector 2 detection circuit 127 detects field 2, sector 2, and outputs a HIGH DT22 signal 128 in field 2, sector 2.

An AFRON signal 129 is HIGH during an audio after-recording, and is otherwise LOW.

An AFRCH1 signal 130 is HIGH during an after-recording of audio channel 1, and is otherwise LOW.

An AFRCH2 signal 131 is HIGH during an after-recording of audio channel 2, and is otherwise LOW.

An AFRCH3 signal 132 is HIGH during an after-recording of audio channel 3, and is otherwise LOW.

An AFRCH4 signal 133 is HIGH during an after-recording of audio channel 4, and is otherwise LOW.

A recording gate generator 134 outputs gate signals required for recording when the WTEN signal 135 is input. Specifically, it outputs BSGT signal 142, WTGT signal 143, and PKHD signal 144 to a semiconductor laser drive circuit 141, outputs a HIGH ENA signal 145 in each area recording audio information for that sector, and outputs a HIGH ENV signal 146 in each area recording video information for that sector.

The semiconductor laser drive circuit 141 drives the semiconductor laser for data reading and writing.

A data buffer for audio channel one 136 outputs buffered information when the ENA1 signal 147 is HIGH.

A data buffer for audio channel two 137 outputs buffered information when the ENA2 signal 148 is HIGH.

A data buffer for audio channel three 138 outputs buffered information when the ENA3 signal 149 is HIGH.

A data buffer for audio channel four 139 outputs buffered information when the ENA4 signal 150 is HIGH.

A video information buffer 140 outputs buffered information when the ENV signal 146 is HIGH.

The semiconductor laser drive circuit 141 is constructed identically to that shown in FIG. 3 of the first embodiment above.

Figure 9:
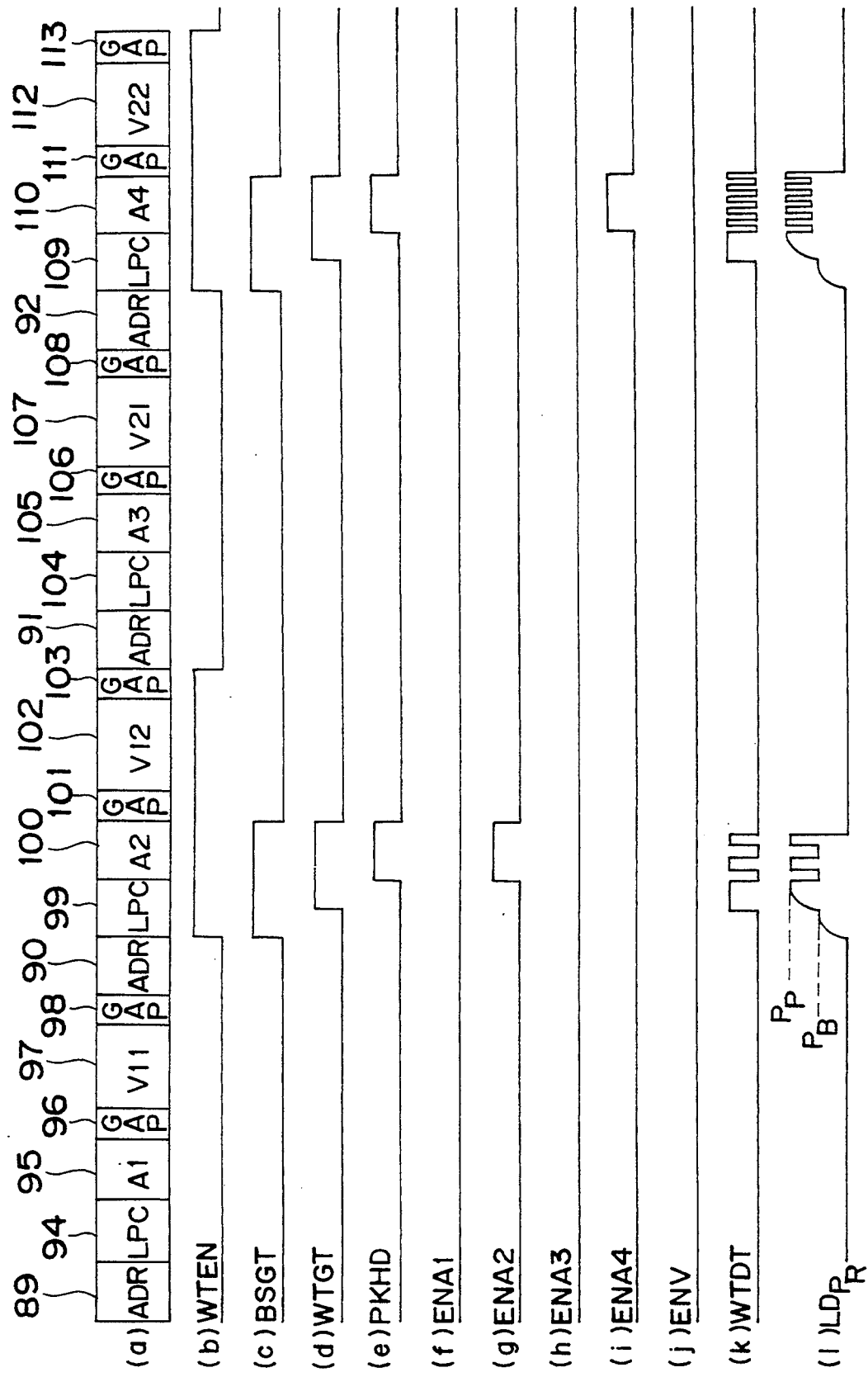

FIGS. 9(a–l) are operating waveform diagrams of the recording method according to the second embodiment of the invention during the audio after-recording operation of the second and fourth audio channels. Operation of this function is described next.

For easy reference, the recording format shown in FIG. 7 is shown again in (a) of FIG. 9. Address block 89 contains the address for field 1, sector 1 of the frame to be recorded. Address block 90 contains the address for field 1, sector 2 of the frame to be recorded. Address block 91 contains the address for field 2, sector 1 of the frame to be recorded. Address block 92 contains the address for field 2, sector 2 of the frame to be recorded.

The recording frame detection circuit 119 detects whether address block 89, 90, 91, or 92 contains the address of the frame to be recorded, and outputs a HIGH WTFN signal 120 in each sector. The AFRON signal 129 is HIGH, AFRCH1 signal 130 is LOW, AFRCH2 signal 131 is HIGH, AFRCH3 signal 132 is LOW, and AFRCH4 signal 133 is HIGH to enable an after-recording of the second and fourth audio channels. Based on the WTFN signal 120, a WTEN signal 135 that is HIGH for only field 1, sector 2 and field 2, sector 2, i.e., those sectors containing the second and fourth audio channels, is output to the recording gate generator 134 ((b) of FIG. 9).

The recording gate generator 134 thus detects the WTEN signal 135 output and the AFRON signal 129 HIGH state, and outputs gate signals for the corresponding field and sector. The signals for field 1, sector 2 may be as follow.

A BSGT signal is HIGH from the beginning of the LPC field 99 preceding the area A2 100 for recording the second audio channel to the end of the second audio channel recording area A2 100 ((c) of FIG. 9).

A WTGT signal is HIGH from midway through the LPC area 99 to the end of the second audio channel recording area A2 100 ((d) of FIG. 9).

A PKHD signal is HIGH from the end of the LPC area 99 to the end of the second audio channel recording area A2 100 ((e) of FIG. 9 ).

An ENA signal is HIGH only during the second audio channel recording area A2 100, and an enable audio channel two ENA2 signal 148 is therefore HIGH during the second audio channel recording area A2 100 ((g) of FIG. 9).

An ENV signal remains LOW ((j) of FIG. 9).

The resulting WTDT signal is shown in (l) of FIG. 9.

The resulting laser beam as shown in (l) of FIG. 9 thus records only the second and fourth audio channel data to the optical disk.

As will be known from the above description, after-recording of the first audio channel is possible by setting the AFRCH1 signal 130 HIGH, after-recording of the second audio channel is enabled by setting the AFRCH2 signal 131 HIGH, after-recording of the third audio channel is enabled by setting the AFRCH3 signal 132 HIGH, and after-recording of the fourth audio channel is enabled by setting the AFRCH4 signal 133 HIGH. Basically, each of the audio channels can be independently recorded to the optical disk.

The normal audio and video information recording operation is described below with reference to FIGS. 10(a–l).

Figure 10:
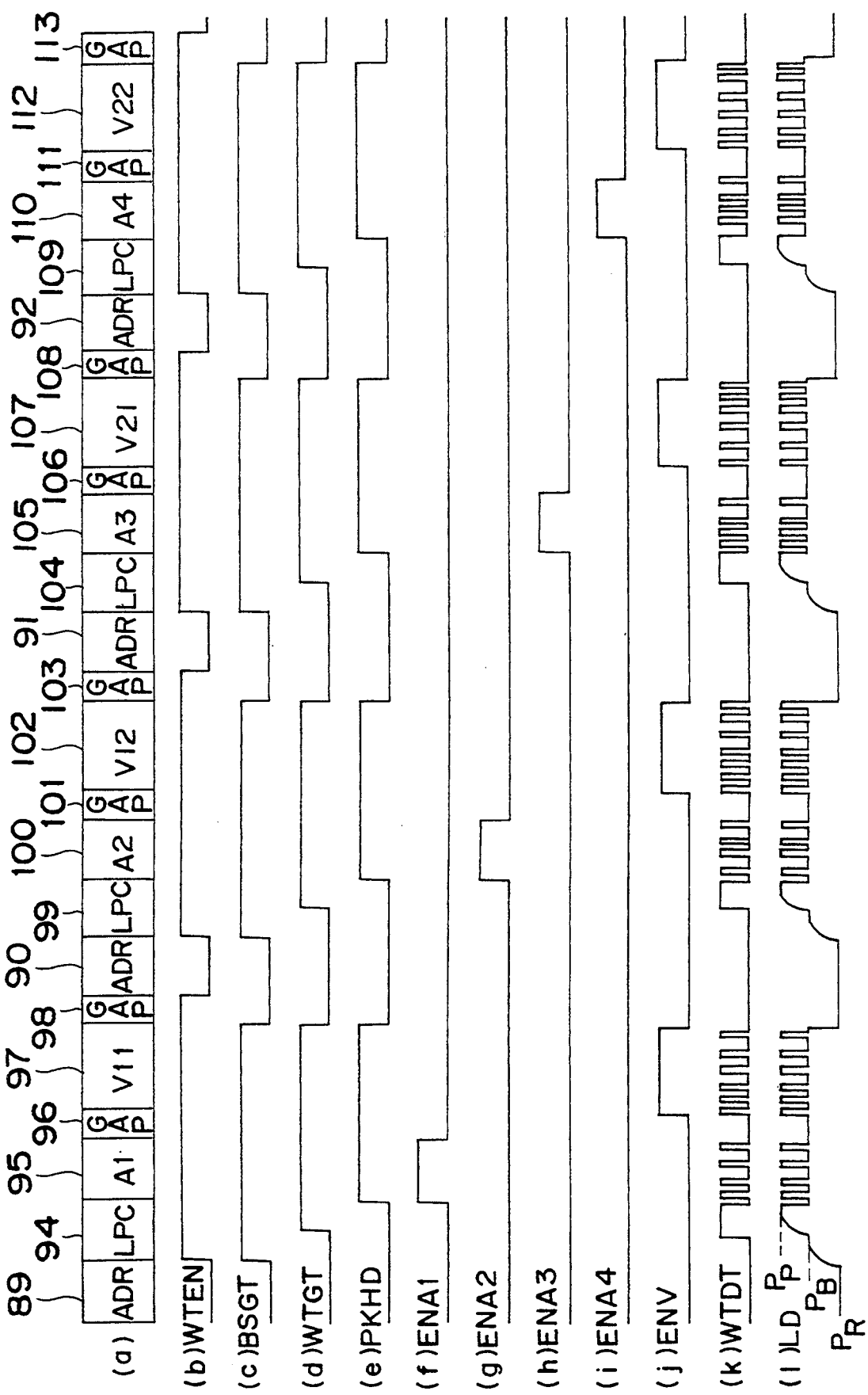

For easy reference, the recording format shown in FIG. 7 is shown in (a) of FIG. 10. Address block 89 contains the address for field 1, sector 1 of the frame to be recorded. Address block 90 contains the address for field 1, sector 2 of the frame to be recorded. Address block 91 contains the address for field 2, sector 1 of the frame to be recorded. Address block 92 contains the address for field 2, sector 2 of the frame to be recorded.

The recording frame detection circuit 119 detects whether address block 89, 90, 91, or 92 contains the address of the frame to be recorded, and outputs a HIGH WTFN signal 120 in each sector.

Because the AFRON signal 129 is LOW at this time, the WTFN signal 120 is output as the WTEN signal 135 ((b) of FIG. 10).

The recording gate generator 134 thus detects WTEN signal 135 output and the AFRON signal 129 OFF state, and outputs gate signals for the corresponding field and sector. The signals for field 1, sector 1 may be as follows.

The BSGT signal is HIGH from the beginning of the LPC area 94 to the end of the first audio channel recording area A1 95 ((c) of FIG. 10).

The WTGT signal is HIGH from midway through the LPC area 94 to the end of the first audio channel recording area A1 95 ((d) of FIG. 10).

The PKHD signal is HIGH from the end of the LPC area 94 to the end of the first audio channel recording area A1 95 ((e) of FIG. 10).

The ENA signal is HIGH only during the first audio channel recording area A1 95, and the enable audio channel one ENA1 signal 147 is therefore HIGH during the first audio channel recording area A1 95 ((f) of FIG. 10).

The ENV signal is HIGH only during the video area V11 97 ((j) of FIG. 10).

Likewise in field 1, sector 2, the ENA2 signal 148 is HIGH during the second audio channel recording area A2 100, and the ENV signal is HIGH during the video area V12 102.

In field 2, sector 1, the ENA3 signal 149 is HIGH during the third audio channel recording area A3 105, and the ENV signal is HIGH during the video area V21 107.

In field 2, sector 2, the ENA4 signal 150 is HIGH during the fourth audio channel recording area A4 110, and the ENV signal is HIGH during the video area V22 112.

The resulting WTDT signal is shown in (k) of FIG. 10.

The resulting laser beam as shown in (l) of FIG. 10 thus records both the audio and video information to the optical disk.

As described hereinabove, by separating the information for one field into plural recording sectors, providing an area for adjusting the laser power to the required level at the beginning of each sector, and providing an area for recording the audio information immediately after the laser power adjustment area, after-recording of a multiple channel sound track can be done separately by each channel.

It is to be noted that a phase-change erasable media is used for recording in the first and second embodiment descriptions above, but the essential effect of the invention can also be achieved when recording to a magneto-optical medium or other optical recording medium.

As described above, the important feature of this invention is that audio after-recording to an optical recording medium is made possible by using a recording format whereby the audio information is recorded immediately after an area used to set the optical beam power to the desired level.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An audio and video information recording method for recording audio and video information by means of optical beam irradiation to an optical information recording medium having a plurality of recording units being characterized by:

allocating an area for recording audio information immediately after an area used to set the power of said optical beam irradiation to a desired level in each recording unit and an area for recording video information after said area for recording audio information; and recording audio information to be recorded in each recording unit to said area for recording audio information.

2. The audio and video information recording method as claimed in claim 1 in which said recording unit is a field.

3. The audio and video information recording method as claimed in claim 1 in which said recording unit is a sector.

4. The audio and video information recording method as claimed in claim 1 in which said audio information is multichannel information and audio information of some channels is recorded after recording said video information.

5. An optical information recording medium for recording audio and video information by means of optical beam irradiation in unit of a predetermined recording length being characterized in that said optical information recording medium is formatted in such a manner that an area for setting the power of said means of optical beam irradiation to a desired level is provided after an address area for addressing each unit and an area for recording audio information to be recorded in each unit is provided immediately after said area for setting the power of said means of optical beam irradiation.

6. The optical information recording medium as claimed in claim 5 in which said unit of a predetermined recording length is a field.

7. The optical information recording medium as claimed in claim 5 in which said unit of a predetermined recording length is a sector defined by dividing one field into plural.

* * * * *

UNITED STATES PATENT AND TRADEMARK OFFICE
CERTIFICATE OF CORRECTION

PATENT NO. : 5,375,111
DATED : December 20, 1994
INVENTOR(S) : Takashi Ishida et al It is certified that error appears in the above-indentified patent and that said Letters Patent is hereby corrected as shown below:

Column 3, line 58, "A12" should read --A1 2--.
Column 5, line 56, "A12" should read --A1 2--.
Column 7, line 18, "diagram" should read --diagrams--.
Column 7, line 38, "A12" should read --A1 2--.
Column 11, line 28, "(i)" should read --(1)--.

Signed and Sealed this

Fourteenth Day of November, 1995

Attest:

BRUCE LEHMAN

Attesting Officer

Commissioner of Patents and Trademarks